Dec. 29, 1959   M. T. DUBIN ET AL   2,919,200
BACTERIOSTATIC PLASTIC

Filed March 25, 1955   3 Sheets-Sheet 1

INVENTORS:
MAURICE T. DUBIN,
JAMES S. WHITE,
By Kingsland, Rogers & Ezell
ATTORNEYS Dec. 29, 1959   M. T. DUBIN ET AL   2,919,200
BACTERIOSTATIC PLASTIC Filed March 25, 1955   3 Sheets—Sheet 2

INVENTORS:
MAURICE T. DUBIN,
JAMES S. WHITE,
BY Kingsland, Rogers & Ezell
ATTORNEYS

United States Patent Office 2,919,200
Patented Dec. 29, 1959

2,919,200

BACTERIOSTATIC PLASTIC

Maurice T. Dubin and James S. White, University City, Mo., assignors to Steril-Plast, Inc., St. Louis, Mo., a corporation of Missouri Application March 25, 1955, Serial No. 496,728

9 Claims. (Cl. 106—15)

This invention relates to improvements in self-sterilizing plastics, and in particular is concerned with a plastic material that is bacteriostatic.

Through this invention there has been provided a process for producing a bacteriostatic plastic and a product resulting therefrom which is effective to kill disease and infection-producing micro-organisms coming into contact with the surface of the plastic. The plastic produced according to this invention can be utilized in a manifold number of molded objects which are designed to come within contact of the human skin. The term "molded" as used in this application is used in its broad sense to include forming generally under the usual high temperatures encountered in organic plastic-making techniques and encompasses other obvious forming methods such as potting, extruding, sheeting and the like. This bacteriostatic plastic material is of incalculable value in applications where the plastic comes in contact with the skin of a human being or the mouth through the prevention of passage of many germs or disease-producing micro-organisms to the body. Thus, where used in drinking glasses, children's toys, utensils, mouthpieces, and other applications where the plastic material is designed to come in contact with the mouth, there is a tremendous advantage obtained through this invention. In general, the bacteriostatic plastic can be considered for the production of any items through which disease might be transmitted because of its being handled and used by more than one person, and extremely rigid sterile precautions which have been required in the past are thereby obviated or greatly reduced.

The bacteriostatic plastic of this invention has the capacity to kill many types of bacteria, streptococci, fungi, and other disease and infection-producing micro-organisms which might come into contact with the surface of the molded object made of this material. Such micro-organisms are those which commonly cause "strep-throat," pneumonia, influenza, etc., and other common communicable diseases, and in general the bacteriostatic plastic is fatal to organisms which are classified bacteriologically as gram positive. This gram positive group of organisms includes, generally speaking, the pus and infection-producing organisms. In addition, the bacteriostatic plastic is a specific antifungicide, and is deadly to such organisms as the *Trichyphyton gypseum* which is instrumental in causing "athlete's foot."

The bacteriostatic plastic of this invention has the further ability to maintain its efficacy after repeated washings, such as would be commonly employed in many applications. The longevity is measured in a period of years which outlast the life of almost all applied usages of the plastic.

Accordingly, it is a principal object of this invention to provide a plastic material which is bacteriostatic with long-lasting qualities.

Still another object of this invention is to provide a bacteriostatic plastic which can be used for application against the human skin without any toxic or irritant effects.

Yet another object of this invention is to provide a bacteriostatic plastic molding composition which can be easily molded into a manifold number of shapes or different articles through an easily controlled process.

Still a further object of this invention is to provide a process for producing a bacteriostatic plastic through the addition of a bacteriostatic agent to a molding composition to provide a substantially permanent bacteriostatic plastic.

Yet another object of this invention is to provide a process for producing and a resulting bacteriostatic plastic through the incorporation of a bacteriostatic compound which comprises two chlorophenol radicals separately linked to a common linking radical.

Yet another object of this invention is to provide a process for producing a bacteriostatic plastic and the resulting product through the incorporation of a solid bacteriostatic agent with a thermoplastic molding composition in a temperature controlled molding process where the bacteriostatic agent is caused to melt and recrystallize within the plastic.

Still another object of this invention is to provide a bacteriostatic plastic from commonly available materials in an easily controlled process with minimum expenditures of time and money.

Still further objects of this invention will appear in the detailed description which follows and will be further apparent to those skilled in the art.

Reference will now be had to the description below explaining how the bacteriostatic plastic can be obtained from the process of this invention. It is to be understood that this invention is not limited to the detailed description which follows, and that certain obvious variations apparent to those skilled in the art may be had in the processing and compounding of the bacteriostatic plastic. For the purpose of illustrating the internal characteristics of the plastic, there are shown several photographs.

In these photographs:

Figure 1:
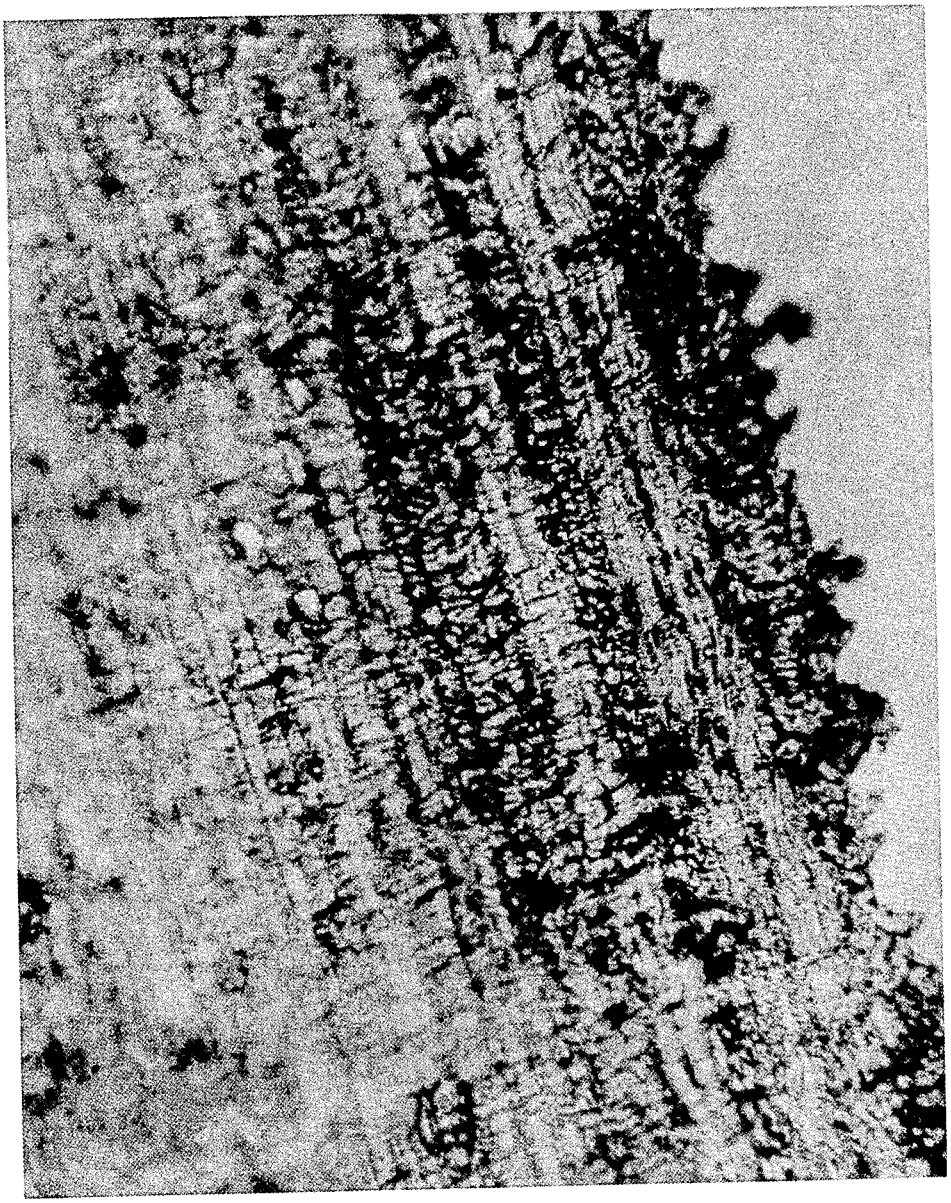
Figure 1 is a photograph of a cross section of a plain plastic material of modified polystyrene and acrylonitrile.

The bacteriostatic agent utilized in this invention comprises a compound which includes two chlorophenol groups separately linked to a common atom. For the purpose of illustration, this may be the compound Actamer sold by Monsanto Chemical Company, of St. Louis, Missouri. The chemical designation for this compound is 2,2'-thiobis (4,6-dichlorophenol). This compound has the structural formula:

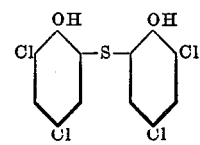

As another example of the bacteriostatic agent which can be utilized, Hexachlorophene such as that manufactured by Sindar Corporation, of New York, as compound G-11, has been found useful. This compound has the chemical designation 2,2'-methylenebis-(3,4,6-trichloro) phenol, which can also be expressed as bis-(3,5,6-trichloro-2-hydroxy phenyl) methane. The structural formula is:

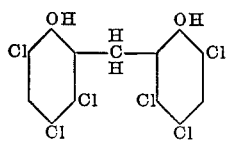

Both of these compounds Actamer and Hexachlorophene are unique in that they are highly bacteriostatic against gram positive organisms and are non-toxic in the application of this invention. Further, they are both solids at room temperature with Actamer having a melting point between 368° and 371° F. with Hexachlorophene having a melting point between 322° and 332° F. Both are also crystalline solids of rhombohedral needle-like form. Both of these compounds are also substantially odorless with a neutral taste.

Both Actamer and Hexachlorophene have very high capacity as bacteriocides and materially reduce the numbers of micro-organisms and inhibit the growth and multiplication of micro-organisms which occur naturally and pathogenically in the skin bacteria flora. Specifically, both of these compounds are very effective against gram positive organisms at low concentrations such as 0.0001% and below, and the oral toxicity is extremely low. Further, no significant reactions have been observed using these compounds in patch tests on human skin so that neither one of these compounds in the application of this invention is a primary irritant nor a sensitizer of high index.

It has been found that both Actamer and Hexachlorophene have been exceptionally effective when incorporated in thermoplastic resins and then molded at temperatures above the melting point but below the decomposing or "break-down" temperatures of these respective compounds. The bacteriostatic properties of the resultant plastics are quite strong and long lasting through tests which will be described below. It appears that the bacteriostatic compounds of this invention recrystallize and reorient themselves in the molded plastic and undergo no chemical linkage, which may explain their durable characteristics. Repeated washings, scrubbings and other hardship tests have failed to diminish the effectiveness.

As an actual example of the process of this invention, a number of plastic discs were made which were then subjected to bacteriostic testing. These discs were made from 100 parts by weight of thermoplastic molding powder, four parts of the bacteriostatic agent, and dry mixed. Subsequently, these molding preparations were injection molded at 10,000 p.s.i.g. at 20 seconds.

In all cases, the molding was carried out at a temperature above the melting point of the bacteriostatic agent. For the case of polyethylene, for example, molding was carried out at 425° F., while for polystyrene the temperature was 440° F. Modified polystyrene copolymerized with acrylonitrile was molded at 440° F., and in still another example cellulose acetate butyrate was molded at 400° F.

Discs weighing about 3 grams, made according to the molding process outlined above, were then tested under the procedure outlined in U.S.D.A. circular 198, using *Micrococcus pyogenes* var. *aureus*. First of all, polyethylene bacteriostatic discs using Actamer were tested.

Example I

Plain polyethylene discs and the bacteriostatic polyethylene discs were placed in intimate contact with hardened nutrient agar previously inoculated with the test organism. Plates containing this preparation were incubated at 37° C. for forty-eight hours under unglazed porcelain tops. The plain polyethylene disc showed no zone of inhibition, while the bacteriostatic polyethylene disc shows a 4 mm. zone of inhibition.

Subsequently, the polyethylene bacteriostatic disc was tested against repeated scrubbing, soaking, and other applications which would simulate a normal household use. The results were as follows for these polyethylene bacteriostatic discs:

Disc No. 1 immersed in tap water for 72 hours—6 to 8 mm. zone of inhibition.

Disc No. 2 washed in water six times—6 to 8 mm. zone of inhibition.

Disc No. 3 scrubbed with a household detergent (12 scrubbings)—7 to 9 mm. zone of inhibition.

Example II

The same test procedure was followed with a bacteriostatic disc molded from Actamer and cellulose acetate butyrate as that described above. In this test, the zone of inhibition was 3 to 5 mm.

Example III

Also, under the same described test procedures, a molded disc of Actamer was modified polystyrene copolymerized with acrylonitrile was tested, and a zone of inhibition of 4 to 6 mm. was observed.

Example IV

Hexachlorophene molded with modified polystyrene and acrylonitrile copolymer was then tested under this same described procedure. In this test, the plastic disc had an observed zone of inhibition of 3 to 5 mm.

These tests with the bacteriostatic agents described in this invention have proved the utility and efficacy of molded products made according to the process of this invention. Other materials have been tested and found wanting. As an example, the antibiotic and bacteriostatic agent tyrothricin was molded with a modified polystyrene and acrylonitrile copolymer and tested under the U.S.D.A. described procedure outlined above. In this test, no activity at all in the zone of inhibition was obtained. In an analysis of the disc molded with tyrothricin, it appeared that it had burned or charred, which rendered its bacteriostatic activity useless in the molded product.

Tests have shown that the bacteriostatic agent of this invention exists in the final molded product in chemically uncombined and unlinked, or at least a very loosely linked, bond. Thus, Actamer compounded in the amount of 4% by weight with polyethylene was tested to obtain the characteristics of its incorporation in the molded plastic.

This test procedure involved placing the plastic sample in boiling benzene until complete physical disintegration had taken place. The resulting mixture was then extracted with sodium hydroxide. The sodium hydroxide extracts were combined, acidified, and then extracted with ether. These ether extracts were evaporated to dryness and weighed and the Actamer content found to be extractible was 3.7%.

Since about 4% by weight of the Actamer was originally incorporated into the polyethylene discs, it can be seen that practically a quantitative recovery of the Actamer was obtained. On the basis of the treatment accorded this sample, it is quite likely that no compound formation took place between Actamer and polyethylene. If such a compound be formed, it is quite improbable that boiling benzene or cold alkali would have been a sufficiently drastic treatment to decompose it to Actamer and polyethylene. Therefore, it may be concluded that the Actamer exists in this combination as a physical mixture with the polyethylene or at the very most, a very weakly held complex.

Physical tests have also been made to determine the structure of the bacteriostatic plastic. As an example, sample discs made according to this invention were examined under a light microscope at a magnification of about 100 diameters. Then photomicrographs were taken at a total magnification of 450 diameters and the negatives were then enlarged optically to a total print size of 1000 diameters.

In the physical testing procedures, the bacteriostatic plastic discs were cut in cross section to determine their physical structure. A Spencer model 820 rotary microtome and glass knife were used in cutting a continuous or ribbon-like sample. Specimens in the region of 2½ microns thick were cut. The actual discs studied were Styron plastic (modified polystyrene with acrylonitrile copolymer) and Actamer as the bacteriostatic agent.

In Figure 1, there is shown a microtome section of the plain Styron disc without the bacteriostatic agent. The specimen here was about 2½ microns thick and distinct layers of lamination structures parallel with the surface can be observed throughout the specimen. The knife-edged direction is parallel with the surface in all cases. This specimen is generally indicated at 10.

Figure 2:
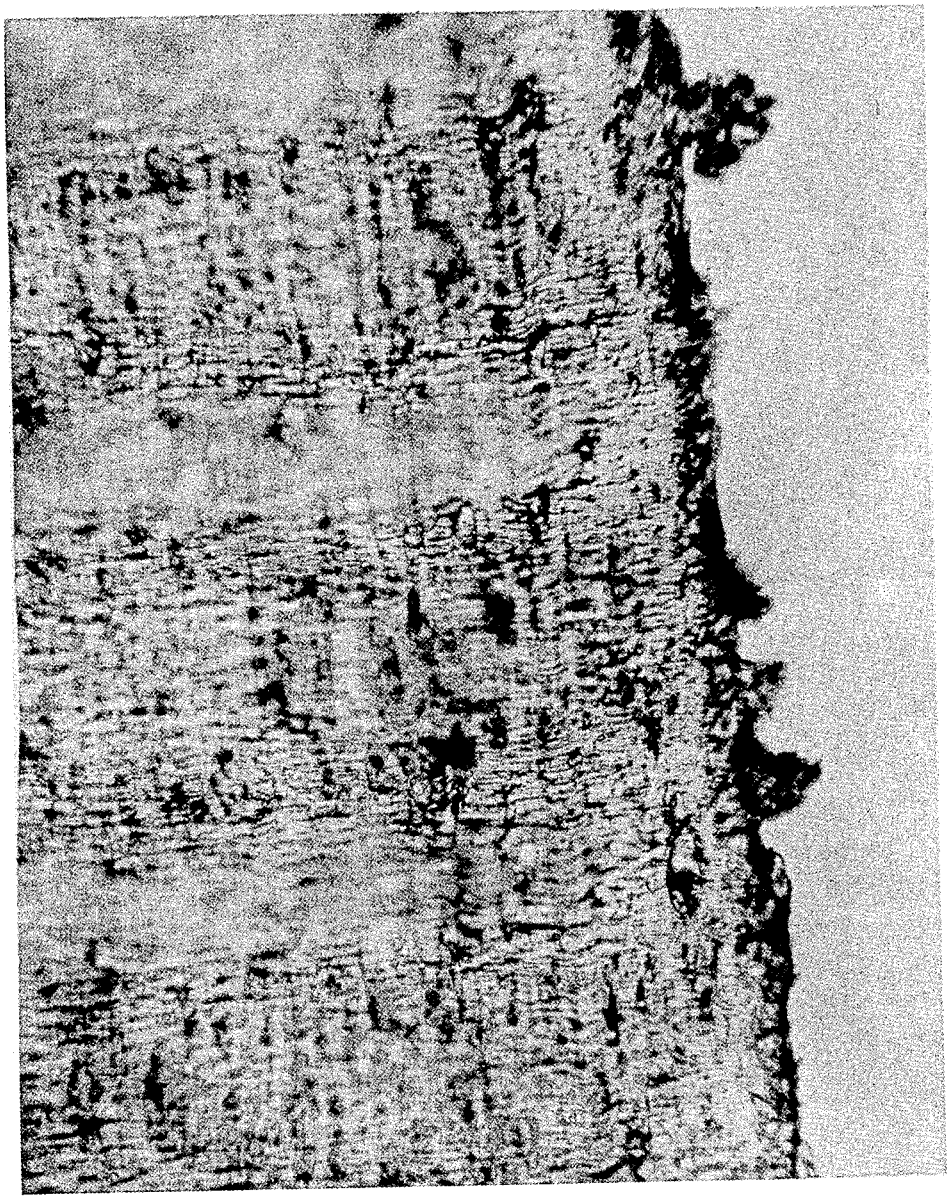
Figure 2 is a cross section of the same plastic as the photograph of Figure 1 with the addition of a pigment to the plastic.

Figure 2 is a photograph of a microtome section of the Styron plastic plus an inorganic pigment, which is generally indicated at 11. Here the lamination effects have been almost entirely removed.

Figure 3:
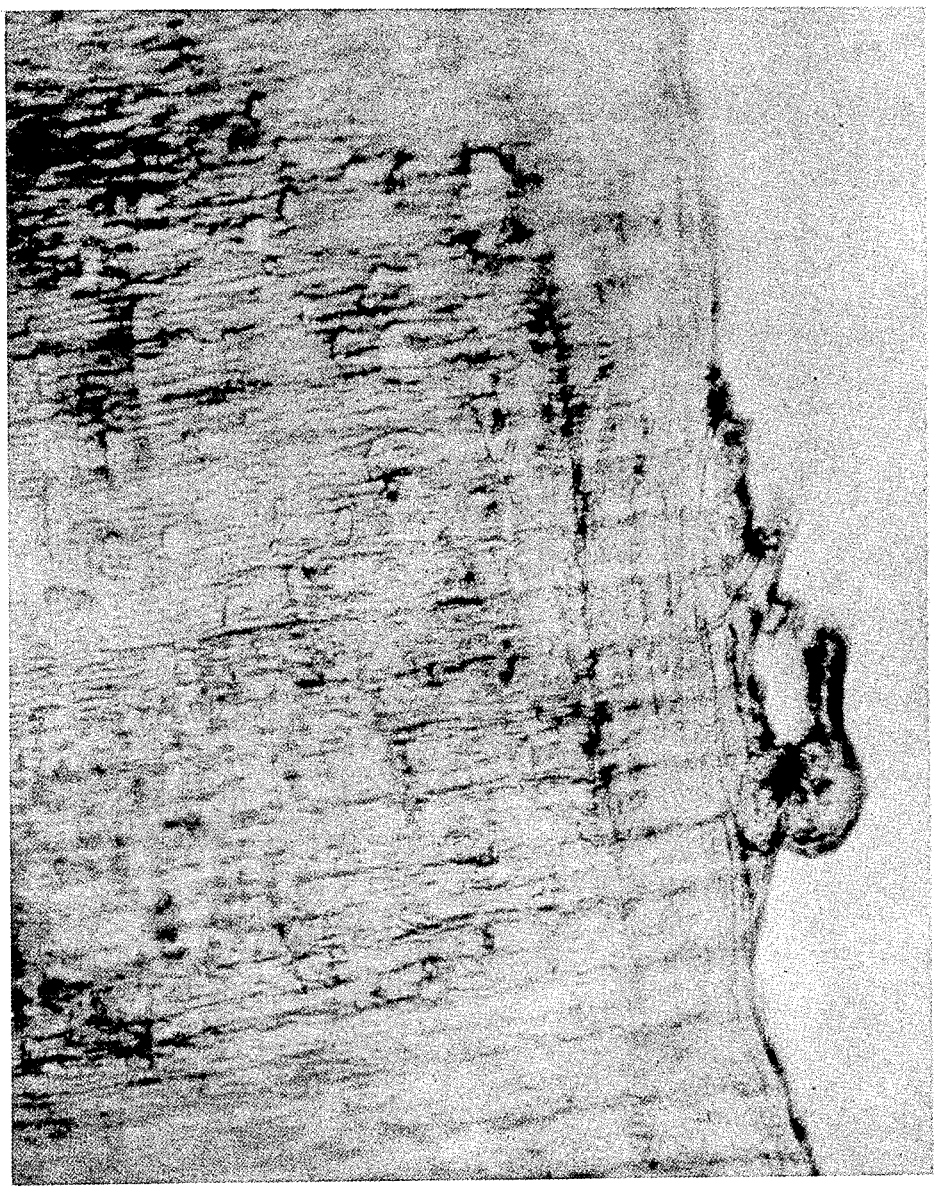
Figure 3 is a cross section photograph of the same plastic as Figures 1 and 2 with a pigment and a bacteriostatic agent of this invention.

Figure 3 is a photomicrograph of a microtome section of the Styron base plus the pigment and plus the bacteriostatic agent which is Actamer in this case. The sample is generally indicated at 12. A decided structural change in this photograph can be observed compared to the previous photographs of Figures 1 and 2. A more homogeneous basic structure is observed with random occurrence of what appear to be inclusion bodies 13. Of particular interest is the structure of the apparent layer or laminations which, in contrast to the laminated structure of Figure 1, are evenly spaced and are perpendicular to the surface of the plastic. Repeated tests have shown this to be a constant phenomenon in the bacteriostatic plastic of this invention.

It is believed that this laminated structure of the bacteriostatic plactic, as Figure 3, is effected by the perpendicular orientation of the recrystallized Actamer in the molding process of this invention. It is important in the process that the molding temperature be somewhat above the melting point of the bacteriostatic agent in order that in the process a recrystallization through melting and then solidification of the bacteriostatic agent can be effected. Through the application of this process a uniform inclusion within the surface of the plastic is obtained which is long lasting and renders the capacity of the plastic as a bacteriostat very high.

The plastics that are especially suitable in this invention are the thermoplastics classes as have been delineated above by actual example. Thus, these plastics seem to have a relatively open linkage which permits the incorporation of the bacteriostatic agent in a more permanent manner than the cross linked structure of the thermosetting plastics. However, the thermosetting resins in plastics may be used where some sacrifices in permanence and activity can be tolerated.

As a result of following the process of this invention, it is apparent that there can be produced a bacteriostatic plastic in any form which can be conveniently molded. This gives a very extremely varied adaptability to the plastic which can be used in widespread applications. The molded bacteriostatic plastic articles are non-toxic and non-irritant, even to the most sensitive mucous membranes. Also, extensive tests with the bacteriostatic agents have resulted in no allergy or irritant reactions. Also, the length of time during which the bacteriostatic plastic retains its bacteriostatic properties seems to be indefinite. Accelerated aging tests have projected the efficiency and capacity beyond the five-year level which is beyond the normal life of most plastic articles. Further, washing, soaking, scrubbing, and scalding do not deleteriously affect the bacteriostatic properties.

One of the special features of this bacteriostatic plastic is that it is self-sterilizing so that if potent micro-organisms are deposited on the surface, they are rendered ineffective. The value thereby is incalculable in that it can be considered that the plastic, when handled by an infected person, will not transmit disease-producing germs or other infectious organisms through the plastic material to the next handler. The field of utility is not limited to human beings, and the plastic material can be employed in the packaging of foods and the like which are subject to molds. In general, the bacteriostatic plastic can be considered for the production of any item on which micro-organisms might be passed or where they come in contact with the surface of the plastic material.

The particular bacteriostatic agents which are preferred in this invention are Actamer and Hexachlorophene. Both of these compounds can be crystallized to a rhombohedral needle-like form which is of particular advantage in this invention. Further, the melting points are below the temperatures employed in the molding process which permits the recrystallization after cooling in the mold. In addition, the particular temperatures employed in this process are such that there is no charring or deleterious effect on the bacteriostatic agent. This last feature of the temperature control slightly above the melting point of the bacteriostatic agent is important where the full effects are to be obtained. Both Actamer and Hexachlorophene are similar in that they can be crystallized to the aforementioned rhombohedral needle-like crystal and comprise chlorophenol groups which are linked to a common atom, which in the case of Actamer is a sulphur atom and for Hexachlorophene is a $CH_2$ group. It will be apparent to those skilled in the art that various homologs and analogs of these two compounds which come within the above-mentioned requirements of this invention can be employed.

It will be apparent to those skilled in the art that various changes and substitutions or additions can be made to the bacteriostatic plastic material of this invention. Thus, various compatible plasticizers, pigments and dyes can be utilized with advantage since the bacteriostatic agent does not combine with the plastic material and is not deleteriously affected. Such changes and modifications will be within the scope of this invention, as defined by the claims appended hereto.

What is claimed is:

1. A molded bacteriostatic plastic material which is compatible in human contact, said material consisting essentially of an organic plastic and an organic bateriostatic agent uniformly distributed through said plastic, said bateriostatic agent having a decomposition temperature above the molding temperature of said organic plastic and being characterized by its ability to be safely used in contact with the human skin and kill disease-producing micro-organisms including germs, bacteria and fungi, and consisting essentially of a compound of at least one member of the group consisting of 2,2'-thiobis (4,6-dichlorophenol) and 2,2' - methylenebis - (3,4,6 - trichlorophenol).

2. A molded bacteriostatic plastic material which is compatible in human contact, said material consisting essentially of an organic plastic and an organic bacteriostatic agent uniformly distributed through said plastic, said bacteriostatic agent having a decomposition temperature above the molding temperature of said organic plastic and being characterized by its ability to be safely used in contact with the human skin and kill disease-producing micro-organisms including germs, bacteria and fungi, and consisting essentially of 2,2'-thiobis (4,6-dichlorophenol).

3. A molded bacteriostatic plastic material which is compatible in human contact, said material consisting essentially of an organic plastic and an organic bacteriostatic agent uniformly distributed through said plastic, said bacteriostatic agent having a decomposition temperature above the molding temperature of said organic plastic and being characterized by its ability to be safely used in contact with the human skin and kill disease-producing micro-organisms including germs, bacteria and fungi, and consisting essentially of 2,2'-methylenebis-(3,4,6-trichlorophenol).

4. A process for preparing a bacteriostatic plastic which comprises mixing an organic thermo plastic material with an organic bacteriostatic agent which is a solid at ambient atmospheric temperature, said bacteriostatic agent consisting essentially of at least one member of the group consisting of 2,2'-thiobis (4,6-dichlorophenol) and 2,2' - methylenebis - (3,4,6 - trichlorophenol), heating said mixture above the melting point of said bacteriostatic agent and below a temperature where said agent decomposes, and molding said plastic mixture under an elevated pressure.

5. A process for preparing a bacteriostatic plastic which comprises mixing a thermo plastic material comprising at least one member of the group consisting of polyethylene, polystyrene, polystyrene modified with acrylonitrile copolymer, and cellulose acetate butyrate with an organic bateriostatic agent which is a solid at ambient atmospheric temperature, said bacteriostatic agent consisting essentially of at least one member of the group consisting of 2,2'-thiobis (4,6-dichlorophenol) and 2,2'-methylbenebis-(3,4,6-trichlorophenol), heating said mixture above the melting point of said bacteriostatic agent and below a temperature where said agent decomposes, and molding said plastic mixture under an elevated pressure.

6. A molded bacteriostatic plastic material which is compatible in human contact, said material consisting essentially of an organic plastic and an organic bacteriostatic agent uniformly distributed through said plastic, said material being characterized by its ability to be safely used in contact with the human skin and kill disease-producing micro-organisms, said plastic being a thermoplastic comprised of at least one member of the group consisting of polyethylene, polystyrene, polystyrene modified with acrylonitrile copolymer, and cellulose acetate butyrate, and said bacteriostatic agent and consisting of at least one member of the group consisting of 2,2'-thiobis (4,6-dichlorophenol) and 2,2'-methylenebis-(3,4,6-trichlorophenol).

7. A molded bacteriostatic plastic material, said material consisting essentially of an organic thermoplastic material and an organic bacteriostatic agent uniformly distributed through said thermoplastic material, said bacteriostatic agent having a decomposition temperature above the molding temperature of said organic thermoplastic material and being characterized by its ability to kill disease-producing micro-organisms including germs, bacteria and fungi, and consisting essentially of a compound of at least one member of the group consisting of 2,2'-thiobis (4,6-dichlorophenol) and 2,2'-methylenebis-(3,4,6-trichlorophenol).

8. A molded bacteriostatic plastic material, said material consisting essentially of an organic thermoplastic material and an organic bacteriostatic agent uniformly distributed through said thermoplastic material, said bacteriostatic agent having a decomposition temperature above the molding temperature of said organic thermoplastic material, and consisting essentially of a compound of at least one member of the group consisting of 2,2-thiobis (4,6-dichlorophenol) and 2,2-methylenebis-(3,4,6-trichlorophenol).

9. A bacteriostatic plastic composition for use in molding a bacteriostatic plastic material which is compatible in human contact, said composition consisting essentially of an organic plastic molding composition and an organic bacteriostatic agent uniformly distributed throughout said molding composition, said bacteriostatic agent having a decomposition temperature above the molding temperature of said organic plastic molding composition and being characterized by its ability to be safely used in contact with the human skin and to kill disease-producing micro-organisms including germs, bacteria and fungi and consisting essentially of a compound of at least one member of the group consisting of 2,2'-thiobis (4,6-dichlorophenol) and 2,2'-methylenebis-(3,4,6-trichlorophenol).

References Cited in the file of this patent
UNITED STATES PATENTS

| | | |
|---|---|---|
| 2,460,376 | Caprio | Feb. 1, 1949 |
| 2,490,100 | Smith | Dec. 6, 1949 |
| 2,491,287 | Smith et al. | Dec. 13, 1949 |
| 2,497,294 | Cartwright | Feb. 14, 1950 |
| 2,704,732 | Copeman et al. | Mar. 22, 1955 |
| 2,739,941 | Chiddix et al. | Mar. 27, 1956 |

OTHER REFERENCES

Gump et al.: Mfg. Chemist, vol. 24 (1953), pages 143–162.